UNITED STATES PATENT OFFICE.

CHARLES H. PARKER AND JOHN MANDILE, OF BOSTON, MASSACHUSETTS.

ROOFING COMPOUND.

No. 803,190.        Specification of Letters Patent.        Patented Oct. 31, 1905.

Application filed March 27, 1905. Serial No. 252,392.

*To all whom it may concern:*

Be it known that we, CHARLES H. PARKER and JOHN MANDILE, citizens of the United States, residing at Boston, in the county of Suffolk and State of Massachusetts, have invented certain new and useful Improvements in Roofing Compounds; and we do declare the following to be a full, clear, and exact description of the invention, such as will enable others skilled in the art to which it appertains to make and use the same.

This invention relates to plastic roofing compounds; and one of the principal objects of the same is to provide a plastic composition for application to roofs which will set and harden in a comparatively short time.

Another object is to provide a roofing compound which may be quickly applied, which will harden within a comparatively short time, which will be durable and lasting, and which will be a reliable waterproof cover for the ordinary layers of roof-felting or tar-paper.

These and other objects are attained by means of a compound containing the following substances and in substantially the proportions given: Refined coal-tar, fifty gallons; ground slate, (seventy-two mesh fine,) three hundred pounds; plaster-of-paris, (calcined,) one hundred pounds. The coal-tar is first thoroughly heated and then the ground slate is added and thoroughly mixed in. The calcined plaster-of-paris is then added thereto and mixed therewith.

This compound owing to the presence of plaster-of-paris will set in a comparatively short time and will become very hard.

The ground slate and coal-tar when incorporated with plaster-of-paris insures a very durable compound, which can be quickly applied and which is thoroughly waterproof and serviceable.

From the foregoing it will be observed that the proportions of the materials used give a very substantial compound owing to the fact that there are three hundred pounds of ground slate with just sufficient plaster-of-paris to convert the slate into a plastic cement of very durable quality and the heated tar being added to give a waterproof quality to the same.

Having thus described our invention, what we claim as new, and desire to secure by Letters Patent, is—

The herein-described compound for covering roofs, consisting of twenty-five gallons of refined coal-tar, three hundred pounds of ground slate, and one hundred pounds of calcined plaster-of-paris, said compound being formed by heating the tar, adding the ground slate thereto, thoroughly mixing the same, and then adding the plaster-of-paris and mixing the entire mass.

In testimony whereof we have hereunto set our hands in presence of the subscribing witnesses.

CHARLES H. PARKER.
             JOHN MANDILE.

Witnesses:
     DAVID A. SMITH,
     EDWARD J. JONES,
     MARGUERITE B. MATSON.